(12) United States Patent
Tokuhisa et al.

(10) Patent No.: US 9,260,663 B2
(45) Date of Patent: Feb. 16, 2016

(54) LIQUID CRYSTAL COMPOSITION, LIQUID CRYSTAL DISPLAY, AND METHOD FOR PRODUCING LIQUID CRYSTAL DISPLAY

(71) Applicant: JSR CORPORATION, Tokyo (JP)

(72) Inventors: Hiroaki Tokuhisa, Tokyo (JP); Yuusuke Uesaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 48 days.

(21) Appl. No.: 14/453,632

(22) Filed: Aug. 7, 2014

(65) Prior Publication Data

US 2015/0092147 A1    Apr. 2, 2015

(30) Foreign Application Priority Data

Oct. 1, 2013    (JP) ................. 2013-206256

(51) Int. Cl.
| | |
|---|---|
| *C09K 19/54* | (2006.01) |
| *G02F 1/1337* | (2006.01) |
| *G02F 1/1341* | (2006.01) |
| *C09K 19/56* | (2006.01) |

(52) U.S. Cl.
CPC .............. *C09K 19/54* (2013.01); *G02F 1/1341* (2013.01); *G02F 1/133711* (2013.01); *G02F 1/133788* (2013.01); *C09K 19/56* (2013.01)

(58) Field of Classification Search
CPC .... C09K 19/54; C09K 19/56; G02F 1/33711; G02F 1/133788; G02F 1/1341
See application file for complete search history.

(56) References Cited

U.S. PATENT DOCUMENTS

| | | | | |
|---|---|---|---|---|
| 2,129,294 | A * | 9/1938 | Wibaut ................ | C07D 213/73 546/193 |
| 6,303,056 | B1 * | 10/2001 | Fan ........................ | B82Y 30/00 252/299.01 |
| 2012/0313040 | A1 * | 12/2012 | Onouchi ............ | C09K 19/3488 252/299.61 |

FOREIGN PATENT DOCUMENTS

JP    2010-535910    11/2010

* cited by examiner

*Primary Examiner* — Shean C Wu
(74) *Attorney, Agent, or Firm* — Jianq Chyun IP Office

(57) ABSTRACT

A liquid crystal composition is described, including a liquid crystalline compound (A), and at least one nitrogen-containing compound (B) selected from compounds represented by formula (1) and compounds represented by formula (2), $$(R^1)_{\overline{m}} - N \begin{pmatrix} R^2-A^1 \\ R^3-X^1 \end{pmatrix}_{n} \quad (1)$$

$$H_2N - R^{10} - A^1 \quad (2)$$

wherein $R^1$ is a hydrogen atom or a monovalent organic group that is bonded to the nitrogen atom via a chain-shaped hydrocarbon group or an alicyclic hydrocarbon group, $R^2$ and $R^3$ are independently a divalent organic group that is bonded to the nitrogen atom via a chain-shaped hydrocarbon group, an alicyclic hydrocarbon group or *—CO—$R^4$—, $A^1$ is a nitrogen-containing heteroaromatic ring, $X^1$ is a cyclic ether group or a polymerizable unsaturated group, and $R^{10}$ is a divalent organic group that is bonded to the primary amino group via a chain-shaped hydrocarbon group or an alicyclic hydrocarbon group.

8 Claims, 1 Drawing Sheet

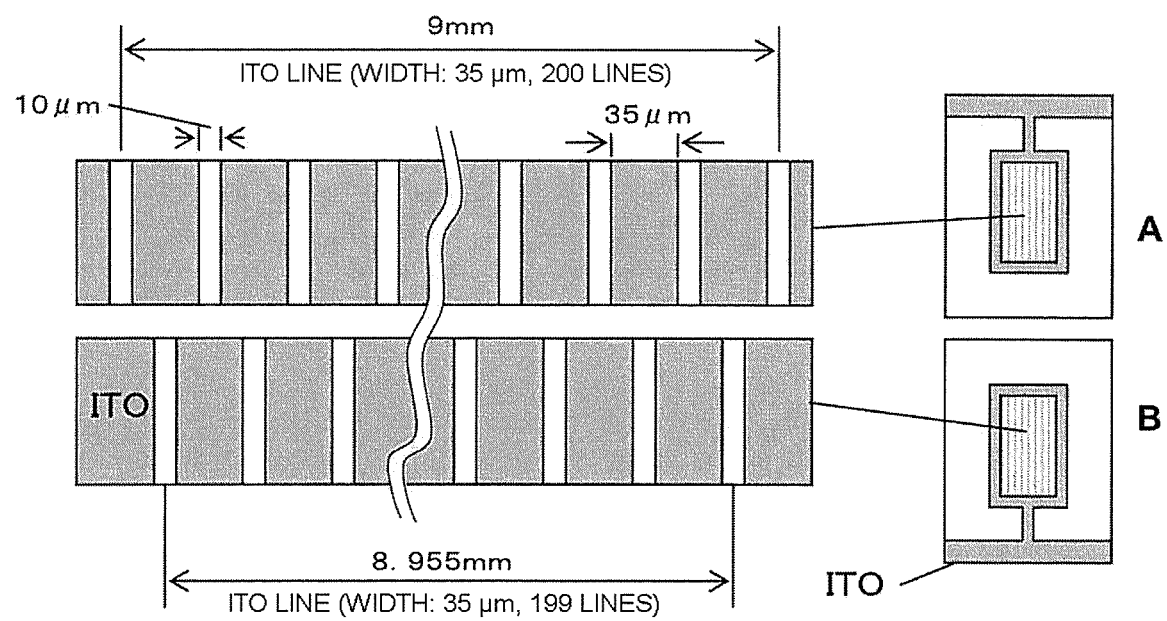

LIQUID CRYSTAL COMPOSITION, LIQUID CRYSTAL DISPLAY, AND METHOD FOR PRODUCING LIQUID CRYSTAL DISPLAY

CROSS-REFERENCE TO RELATED APPLICATION

This application claims the priority benefits of Japan Patent Application No. 2013-206256, filed on Oct. 1, 2013. The entirety of the above-mentioned patent application is hereby incorporated by reference herein and made a part of this specification.

BACKGROUND OF THE INVENTION

1. Field of the Invention

The invention relates to a liquid crystal composition, a liquid crystal display (LCD), and a method for producing a liquid crystal display.

2. Related Art

An LCD normally includes a pair of substrates disposed opposite to each other, a liquid crystal layer including liquid crystal molecules, and liquid crystal alignment layers (liquid crystal alignment films) disposed on both sides of the liquid crystal layer to control the liquid crystal molecules to be in the desired orientation (alignment) state. Various types of LCDs that differ in the electrode structure, the properties of the liquid crystal molecules, or the production process, etc., have been developed. For example, a TN-mode LCD, an STN-mode LCD, a VA-mode LCD, an in-plane switching (IPS)-mode LCD, an FFS-mode LCD, and so on have been known.

In recent years, an LCD has been used in various applications such as an LCD TV, a car navigation system, a mobile phone, a smartphone, and an information display in addition to a display terminal such as a personal computer. A further improvement in quick response capability of a liquid crystal panel has been studied, and attempts have been made to incorporate an alkenyl-based liquid crystal in the liquid crystal layer (see Patent Document 1).

Patent Document 1 is the Japanese Translation of PCT International Application Publication No. 2010-535910).

SUMMARY OF THE INVENTION

An LCD that utilizes an alkenyl-based liquid crystal shows an improved quick response capability, but tends to show a significant decrease in voltage holding ratio after being driven by application of a voltage as compared with an LCD that does not utilize an alkenyl-based liquid crystal. An LCD that deteriorates to only a small extent during use, and exhibits high reliability has been desired from the viewpoint of a further improvement in quality of an LCD.

In view of the above technical problem, the invention provides a liquid crystal composition for producing an LCD that deteriorates to only a small extent during use and exhibits high reliability.

After conducting extensive studies, the inventors found that the above technical problem can be solved by incorporating a specific nitrogen-containing compound in the liquid crystal layer of the LCD. This finding has led to completion of the invention. Several aspects of the invention provide the following liquid crystal composition, LCD, and method for producing an LCD.

According to an aspect of the invention, the liquid crystal composition includes a liquid crystalline compound (A), and at least one nitrogen-containing compound (B) selected from the group consisting of compounds represented by the following formula (1) and compounds represented by the following formula (2).

wherein $R^1$ is a hydrogen atom or a monovalent organic group that is bonded to the nitrogen atom bonded to $R^2$ and $R^3$ via a chain-shaped hydrocarbon group or an alicyclic hydrocarbon group, $R^2$ and $R^3$ are independently a divalent organic group that is bonded to the nitrogen atom bonded to $R^1$ via a chain-shaped hydrocarbon group, an alicyclic hydrocarbon group or *—CO—$R^4$— (wherein $R^4$ is a divalent chain-shaped hydrocarbon group or a divalent alicyclic hydrocarbon group, and * is a bond to the nitrogen atom bonded to $R^1$), $A^1$ is an N-containing heteroaromatic ring, $X^1$ is a cyclic ether group or a polymerizable unsaturated group, m is 0 or 1, and n is an integer from 1 to 3, provided that m+n≤3 is satisfied, a plurality of $R^2$ are either identical or different when a plurality of $R^2$ are present, a plurality of $R^3$ are either identical or different when a plurality of $R^3$ are present, a plurality of $A^1$ are either identical or different when a plurality of $A^1$ are present, and a plurality of $X^1$ are either identical or different when a plurality of $X^1$ are present.

wherein $A^1$ is a nitrogen-containing heteroaromatic ring, and $R^{10}$ is a divalent organic group that is bonded to the primary amino group via a chain-shaped hydrocarbon group or an alicyclic hydrocarbon group.

According to another aspect of the invention, the method for producing an LCD includes: applying a liquid crystal aligning agent to a surface of each of a pair of substrates and heating the same to form a film, and disposing the pair of substrates on which the film is formed and a liquid crystal layer so that the films face each other with the liquid crystal layer in between to form a liquid crystal cell, wherein the liquid crystal layer is formed using the liquid crystal composition of an aspect of the invention. According to another aspect of the invention, an LCD includes a pair of substrates disposed opposite to each other at a given interval, liquid crystal alignment layers respectively on opposing surfaces of the pair of substrates, and a liquid crystal layer disposed between the liquid crystal alignment layers and including a liquid crystalline compound. The liquid crystal layer includes at least one nitrogen-containing compound (B) selected from the group consisting of compounds represented by formula (1) and compounds represented by formula (2).

An LCD that deteriorates to only a small extent during use, and exhibits high reliability can be produced by forming the liquid crystal layer of the LCD using the liquid crystal composition according to an aspect of the invention.

BRIEF DESCRIPTION OF THE DRAWINGS

FIG. 1 is a view illustrating the electrode pattern of a transparent electrode film used in the examples and comparative examples.

DESCRIPTION OF THE EMBODIMENTS

Each component included in the liquid crystal composition is described below.

Liquid Crystalline Compound (A)

Examples of the liquid crystalline compound (A) included in the liquid crystal composition include compounds having a liquid crystal phase, such as a nematic liquid crystal or a smectic liquid crystal, wherein a nematic liquid crystal is preferred. For example, when producing a TN-mode LCD, an STN-mode LCD, an IPS-mode LCD, or an FFS-mode LCD, it is preferred to use a liquid crystal having positive dielectric anisotropy. Specific examples of such a liquid crystal include a biphenyl-based liquid crystal, a phenylcyclohexane-based liquid crystal, an ester-based liquid crystal, a terphenyl-based liquid crystal, a biphenylcyclohexane-based liquid crystal, a pyrimidine-based liquid crystal, a dioxane-based liquid crystal, a bicyclooctane-based liquid crystal, a cubane-based liquid crystal, and so on. A cholesteric liquid crystal (e.g., cholestyl chloride, cholesteryl nonate, or cholesteryl carbonate) or a ferroelectric liquid crystal (e.g., p-decyloxybenzilidene-p-amino-2-methylbutyl cinnamate), etc., may be added to the above liquid crystal. When producing a vertical alignment-mode LCD (e.g., VA-mode LCD or MVA-mode LCD), it is preferred to use a liquid crystal having negative dielectric anisotropy. Specific examples of such a liquid crystal include a dicyanobenzene-based liquid crystal, a pyridazine-based liquid crystal, a Schiff base-based liquid crystal, an azoxy-based liquid crystal, a biphenyl-based liquid crystal, a phenylcyclohexane-based liquid crystal, and so on.

It is preferred that the liquid crystalline compound (A) include a liquid crystalline compound having an alkenyl structure (hereinafter may be referred to as "alkenyl-based liquid crystal") in view of improving the fast response capability of the resulting liquid crystal panel. Examples of the alkenyl-based liquid crystal include liquid crystalline compounds that include one alkenyl group or one fluoroalkenyl group. A known alkenyl-based liquid crystal may be used as the alkenyl-based liquid crystal. Specific examples thereof include liquid crystalline compounds having a structure represented by the following formula (a-1).

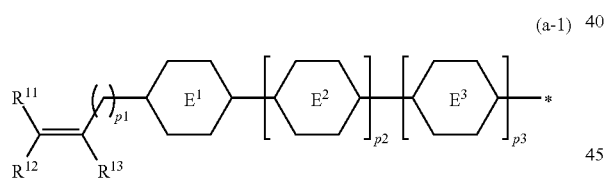

(a-1)

wherein $R^{11}$ and $R^{13}$ are independently a hydrogen atom or a fluorine atom, $R^{12}$ is a hydrogen atom, alkyl having 1 to 6 carbon atoms, or fluoroalkyl having 1 to 6 carbon atoms, $E^1$ is a cyclohexane ring, $E^2$ and $E^3$ are independently a cyclohexane ring or a benzene ring, provided that a hydrogen atom represented by $R^{11}$ and a hydrogen atom included in the cyclic structure represented by $E^2$ and $E^3$ may be substituted with a fluorine atom, p1 is an integer of 0 to 2, p2 is 0 or 1, p3 is 0 or 1, provided that a case where p2 and p3 are 0 is excluded, and * is a bond.

Examples of the alkyl having 1 to 6 carbon atoms represented by $R^{12}$ in formula (a-1) include methyl, ethyl, propyl, butyl, pentyl and hexyl. The alkyl having 1 to 6 carbon atoms represented by $R^{12}$ may be linear or branched. Examples of the fluoroalkyl having 1 to 6 carbon atoms represented by $R^{12}$ include groups obtained by substituting at least one hydrogen atom of the above alkyl groups with a fluorine atom. Examples of a group bonded to * include alkyl having 1 to 6 carbon atoms, fluoroalkyl having 1 to 6 carbon atoms, cyano, and so on.

Specific examples of the liquid crystalline compound having the structure of formula (a-1) include compounds respectively represented by the following formulas (L1-1) to (L1-10), etc.

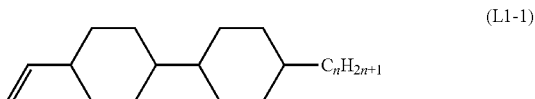
(L1-1)

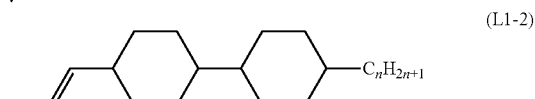
(L1-2)

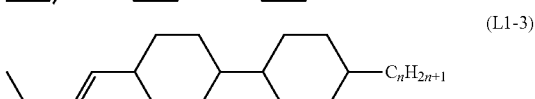
(L1-3)

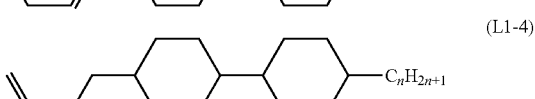
(L1-4)

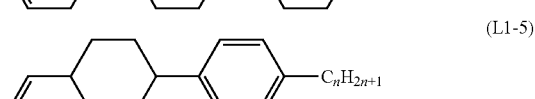
(L1-5)

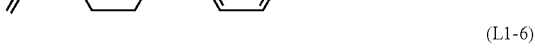
(L1-6)

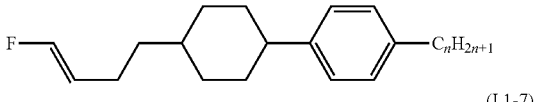
(L1-7)

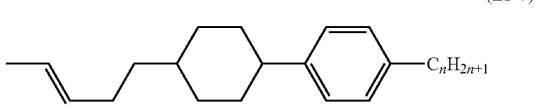
(L1-8)

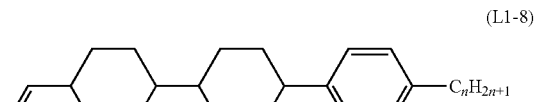
(L1-9)

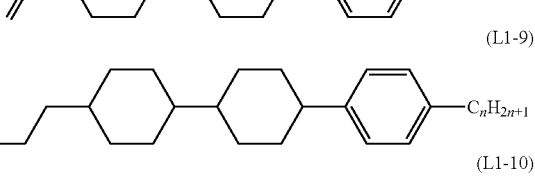
(L1-10)

wherein n is an integer of 1 to 6.

Specific examples of preferred "—$C_nH_{2n+1}$" in the compounds respectively represented by formulas (L1-1) to (L1-10) include methyl, ethyl, n-propyl, n-butyl, n-pentyl and n-hexyl etc.

The alkenyl-based liquid crystal is preferably used in an amount of 0.01 to 40 weight parts, and more preferably 0.05 to 30 weight parts, based on 100 weight parts of the liquid crystalline compound (A). The alkenyl-based liquid crystals may be used either alone or in combination.

Nitrogen-Containing Compound (B)

The liquid crystal composition includes at least one nitrogen-containing compound (B) selected from the group consisting of compounds represented by formula (1) and compounds represented by formula (2). It is noted that a compound represented by formula (1) may be hereinafter referred to as "compound (B-1)", and a compound represented by formula (2) may be hereinafter referred to as "compound (B-2)".

Compound (B-1)

$R^1$ in formula (1) is a hydrogen atom or a monovalent organic group that is bonded to the nitrogen atom bonded to $R^2$ and $R^3$ via a chain-shaped hydrocarbon group or an alicyclic hydrocarbon group. Examples of the monovalent organic group include a monovalent chain-shaped hydrocarbon group; a monovalent alicyclic hydrocarbon group; a monovalent group obtained by introducing —O—, —NH—, —CO—O—, —CO—NH—, —CO—, —S—, —S(O)$_2$—, —Si(CH$_3$)$_2$—, —O—Si(CH$_3$)$_2$—, —O—Si(CH$_3$)$_2$—O—, an aromatic hydrocarbon group (e.g., phenylene group), or a heterocyclic group (e.g., pyridinylene group), etc., between carbon atoms of a monovalent chain-shaped hydrocarbon group or a monovalent alicyclic hydrocarbon group; a monovalent group obtained by substituting at least one hydrogen atom of a monovalent chain-shaped hydrocarbon group or a monovalent alicyclic hydrocarbon group with a halogen atom (e.g., fluorine atom, chlorine atom, bromine atom, or iodine atom), an aromatic hydrocarbon group (e.g., phenyl group), a hydroxyl group, or an alkyl halide group, etc.; and so on.

It is noted that the term "hydrocarbon group" used herein includes a chain-shaped hydrocarbon group, an alicyclic hydrocarbon group, and an aromatic hydrocarbon group. The hydrocarbon group may be either a saturated hydrocarbon group or an unsaturated hydrocarbon group. The term "chain-shaped hydrocarbon group" used herein refers to a linear hydrocarbon group and a branched hydrocarbon group that do not include a cyclic structure in the main chain but include only a chain-shaped structure. The term "alicyclic hydrocarbon group" used herein refers to a hydrocarbon group that includes only an alicyclic hydrocarbon structure as a cyclic structure but does not include an aromatic ring structure. It is noted that the alicyclic hydrocarbon group need not necessarily include only an alicyclic hydrocarbon structure, but may also include a chain-shaped structure. The term "aromatic hydrocarbon group" used herein refers to a hydrocarbon group that includes an aromatic ring structure. It is noted that the aromatic hydrocarbon group need not necessarily include only an aromatic ring structure, but may also include a chain-shaped structure or an alicyclic hydrocarbon structure.

Specific examples of the monovalent chain-shaped hydrocarbon group represented by R' include methyl, ethyl, propyl, butyl, pentyl, hexyl, heptyl, octyl, nonyl, decyl, undecyl, dodecyl, tridecyl, tetradecyl, pentadecyl, octadecyl, icosyl, vinyl, propenyl, butenyl, pentenyl, ethynyl, propynyl, and so on. These groups are either linear or branched. Specific examples of the monovalent alicyclic hydrocarbon group include cyclopropyl, cyclobutyl, cyclopentyl, cyclopentylmethyl, cyclohexyl, methylcyclohexyl, cyclohexylmethyl, cyclohexylethyl, cyclohexenyl, cycloheptyl, cyclooctyl, cyclodecyl, cyclododecyl, cyclotridecyl, cyclotetradecyl, bicyclohexylyl, decahydronaphthyl, norbornyl, methylnorbornyl, adamantyl, and so on.

The number of carbon atoms of the monovalent organic group represented by $R^1$ is preferably 1 to 20, more preferably 1 to 10, and still more preferably 1 to 5.

$R^2$ and $R^3$ in the formula (1) are independently a divalent organic group that includes a chain-shaped hydrocarbon group or an alicyclic hydrocarbon group, and is bonded to the nitrogen atom bonded to R' via a chain-shaped hydrocarbon group, an alicyclic hydrocarbon group, or *—CO—R$^4$—

(wherein $R^4$ is a divalent chain-shaped hydrocarbon group or a divalent alicyclic hydrocarbon group, and * is a bond to the nitrogen atom bonded to R'). Examples of the divalent organic group represented by $R^2$, $R^3$ and $R^4$ include a divalent chain-shaped hydrocarbon group; a divalent alicyclic hydrocarbon group; a divalent group obtained by introducing —O—, —NH—, —CO—O—, —CO—NH—, —CO—, —S—, —S(O)$_2$—, —Si(CH$_3$)$_2$—, —O—Si(CH$_3$)$_2$—, —O—Si(CH$_3$)$_2$—O—, an aromatic hydrocarbon group or a heterocyclic group, etc., between carbon atoms of a divalent chain-shaped hydrocarbon group or a divalent alicyclic hydrocarbon group; a divalent group obtained by substituting at least one hydrogen atom of a divalent chain-shaped hydrocarbon group or a divalent alicyclic hydrocarbon group with a halogen atom (e.g., fluorine atom, chlorine atom, bromine atom, or iodine atom), an aromatic hydrocarbon group (e.g., phenyl group), a hydroxyl group, or an alkyl halide group, etc.; and so on. It is noted that $R^2$ and $R^3$ in the molecule may be either identical or different.

Specific examples of the divalent chain-shaped hydrocarbon group represented by $R^2$, $R^3$ and $R^4$ include methylene, ethylene, propanediyl, butanediyl, pentanediyl, hexanediyl, heptanediyl, octanediyl, nonanediyl, decanediyl, undecanediyl, dodecanediyl, tridecanediyl, tetradecanediyl, pentadecanediyl, octadecanediyl, icosylene, vinylene, propenylene, butenylene, ethynylene, propynylene, and so on. Specific examples of the divalent alicyclic hydrocarbon group represented by $R^2$, $R^3$ and $R^4$ include cyclopropylene, cyclobutylene, cyclopentylene, cyclohexylene, cyclohexenylene, bicyclohexylene, norbornylene, adamantylene, and so on.

The number of carbon atoms of the divalent organic group represented by $R^2$ and $R^3$ is preferably 1 to 20, more preferably 1 to 10, and still more preferably 1 to 5. It is noted that a plurality of $R^2$ are either identical or different when a plurality of $R^2$ are present, and a plurality of $R^3$ are either identical or different when a plurality of $R^3$ are present.

$A^1$ in the formula (1) is a nitrogen-containing heteroaromatic ring. The N-containing heteroaromatic ring is bonded to the nitrogen atom (the nitrogen atom bonded to $R^1$) through $R^2$. The N-containing heteroaromatic ring may be an aromatic ring including one or more nitrogen atoms in the ring skeleton. Specifically, one nitrogen atom or two or more nitrogen atoms may be included in the ring skeleton. The N-containing heteroaromatic ring may include only a nitrogen atom as the heteroatom, or may include a nitrogen atom and a heteroatom (e.g., oxygen atom or sulfur atom) other than a nitrogen atom.

Specific examples of the N-containing heteroaromatic ring represented by $A^1$ include a pyrrole ring, an imidazole ring, a pyrazole ring, a triazole ring, a pyridine ring, a pyrimidine ring, a pyridazine ring, a pyrazine ring, an indole ring, a benzimidazole ring, a purine ring, a quinoline ring, an isoquinoline ring, a naphthyridine ring, a quinoxaline ring, a phthalazine ring, a triazine ring, an azepine ring, a diazepine ring, an acridine ring, a phenazine ring, a phenanthroline ring, an oxazole ring, a thiazole ring, a carbazole ring, a thiadiazole ring, a benzothiazole ring, a phenothiazine ring, an oxadiazole ring, and so on. The N-containing heteroaromatic ring represented by $A^1$ may be substituted with a substituent. Examples of the substituent include a halogen atom, an alkyl group, an alkoxy group, and so on.

It is preferred that the ring skeleton of the N-containing heteroaromatic ring represented by $A^1$ is a pyrrole ring, an imidazole ring, a pyrazole ring, a triazole ring, a pyridine ring, a pyrimidine ring, a pyridazine ring, a pyrazine ring, a benzimidazole ring, a naphthyridine ring, a phthalazine ring, a quinoxaline ring, a triazine ring, an azepine ring, a diazepine ring, or a phenazine ring, and more preferably a pyrrole ring, an imidazole ring, a pyrazole ring, a triazole ring, a pyridine ring, a pyrimidine ring, a pyridazine ring, or a pyrazine ring.

The N-containing heteroaromatic ring may be bonded to $R^2$ at an arbitrary position. For example, when the N-containing heteroaromatic ring represented by $A^1$ is a five-membered ring, it may be bonded to $R^2$ at the 1-, 2- or 3-position. When the N-containing heteroaromatic ring represented by $A^1$ is a six-membered ring, it may be bonded to $R^2$ at the 1-, 2-, 3- or 4-position. When n is 2 or 3, a plurality of $A^1$ are independently defined as described above.

$X^1$ in formula (1) is a cyclic ether group or a polymerizable unsaturated group. The cyclic ether group is preferably an epoxy group (oxiranyl group) or an oxetanyl group, and more preferably an epoxy group. It is preferred that the polymerizable unsaturated group includes a C—C double bond. It is preferred that the polymerizable unsaturated group is acryloxy, methacryloxy, vinyl, vinyloxy, a maleimide group, or styryl.

Specific examples of the preferred compound (B-1) include a compound represented by formula (1-1), a compound represented by formula (1-2), a compound represented by formula (1-3), and so on.

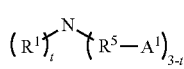

(1-1)

wherein $R^5$ is a divalent chain-shaped hydrocarbon group or a divalent alicyclic hydrocarbon group, t is 0 or 1, and $R^1$ and $A^1$ are the same as defined for formula (1).

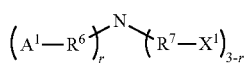

(1-2)

wherein $R^6$ and $R^7$ are independently a divalent chain-shaped hydrocarbon group or a divalent alicyclic hydrocarbon group, r is 1 or 2, and $A^1$ and $X^1$ are the same as defined for formula (1).

(1-3)

wherein $R^8$ is a divalent organic group that is bonded to —CO— via a chain-shaped hydrocarbon group or an alicyclic hydrocarbon group, and $R^2$ and $A^1$ are the same as defined for formula (1).

$R^1$ in formula (1-1) is preferably a hydrogen atom, a monovalent chain-shaped hydrocarbon group having 1 to 10 carbon atoms, or a monovalent alicyclic hydrocarbon group having 3 to 10 carbon atoms, more preferably a hydrogen atom, or a monovalent chain-shaped hydrocarbon group having 1 to 5 carbon atoms, and particularly preferably a hydrogen atom.

The number of carbon atoms of $R^5$ is preferably 1 to 10, more preferably 1 to 5, and still more preferably 1 to 3. $R^5$ may be either chain-shaped or alicyclic, but is preferably chain-shaped, and more preferably an alkanediyl group. Specific examples of preferable $A^1$ include those mentioned above as specific examples of preferred $A^1$ in formula (1).

The description given above in connection with $R^5$ in formula (1-1) may be applied to $R^6$ and $R^7$ in formula (1-2). It is noted that $R^6$ and $R^7$ in the molecule may be either identical or different. Specific examples of preferred $A^1$ include those mentioned above as specific examples of preferred $A^1$ in formula (1). It is preferred that $X^1$ is an epoxy group, acryloxy, methacryloxy, vinyl, vinyloxy, a maleimide group, or styryl, and particularly preferably an epoxy group. In addition, r is 1 or 2, and preferably 2.

Examples of the divalent organic group represented by $R^8$ in formula (1-3) include those mentioned above as specific examples of $R^2$ and $R^3$ in formula (1). The number of carbon atoms of the divalent organic group represented by $R^8$ is preferably 1 to 19, and more preferably 1 to 9. Specific examples of preferred $R^2$ include those mentioned above in connection with $R^5$ in formula (1-1). Specific examples of preferred $A^1$ include those mentioned above as specific examples of preferred $A^1$ in formula (1). It is noted that a plurality of $A^1$ in formula (1-3) may be either identical or different.

It is preferred that the compound (B-1) is a compound represented by formula (1-1) from the viewpoint of suppressing deterioration during use.

Specific examples of the compound (B-1) include the compounds respectively represented by the following formulas (m-1-1) to (m-1-39), and so on. It is noted that formulas (m-1-1) to (m-1-19) correspond to specific examples of compounds represented by formula (I-1), formulas (m-1-26) to (m-1-39) correspond to specific examples of compounds represented by formula (1-2), and formulas (m-1-20) to (m-1-25) correspond to specific examples of compounds represented by formula (1-3). These compounds (B-1) may be used alone or in combination.

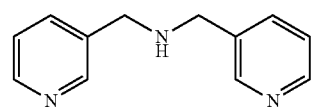

(m-1-1)

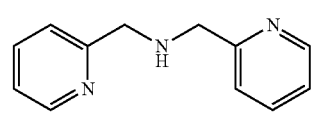

(m-1-2)

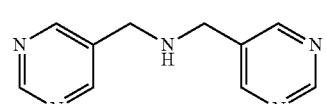

(m-1-3)

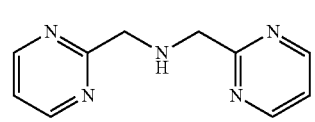

(m-1-4)

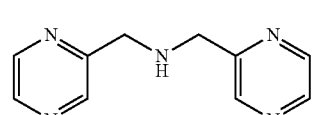

(m-1-5)

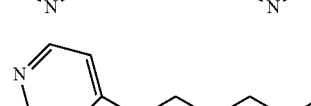

(m-1-6)

(m-1-7)
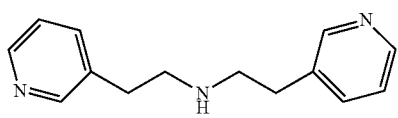
(m-1-8)
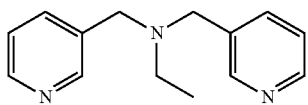
(m-1-9)
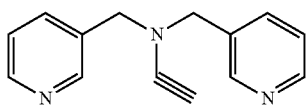
(m-1-10)
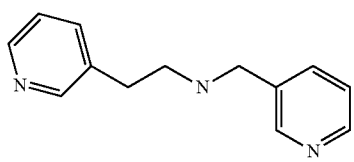
(m-1-11)
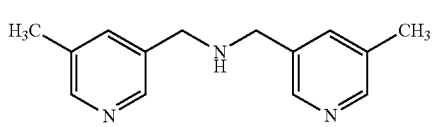
(m-1-12)
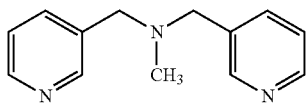
(m-1-13)
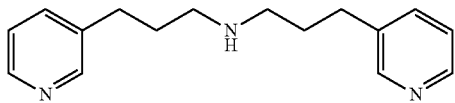
(m-1-14)
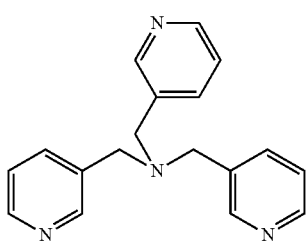
(m-1-15)
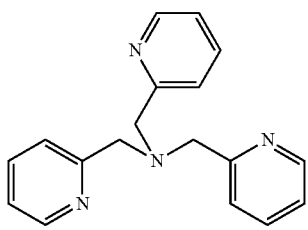
(m-1-16)
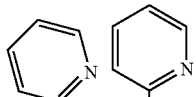
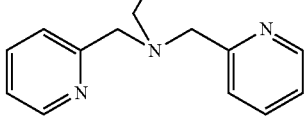
(m-1-17)
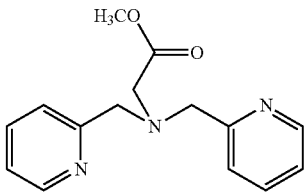
(m-1-18)
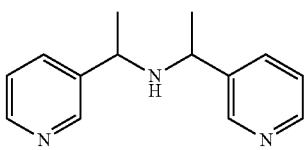
(m-1-19)
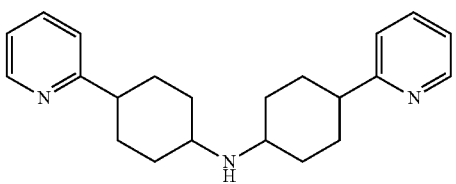
(m-1-20)
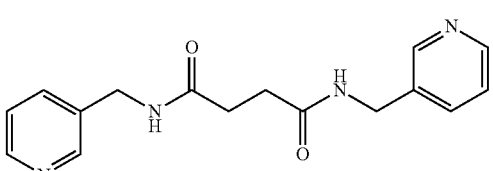
(m-1-21)
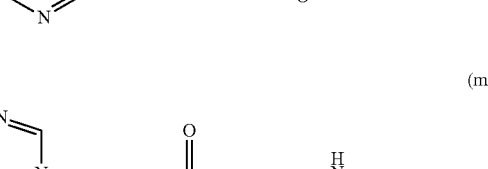
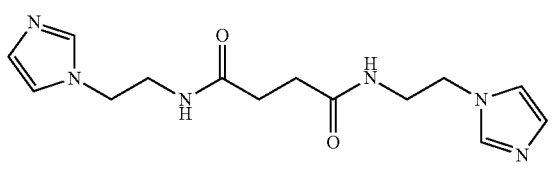
(m-1-22)
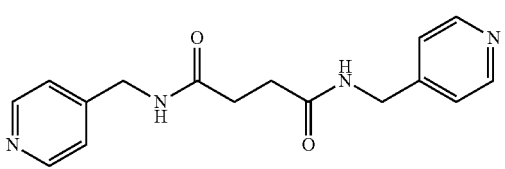

Compound (B-2)

A¹ in formula (2) is a nitrogen-containing heteroaromatic ring. The description given above in connection with A¹ in formula (1) may be applied to the examples of A¹ and specific examples of preferred A¹ in formula (2).

Examples of the divalent organic group represented by $R^{10}$ include those mentioned above in connection with the divalent organic group represented by $R^2$ and $R^3$ in formula (1). It is preferred that $R^{10}$ is a divalent organic group that includes a chain-shaped hydrocarbon group, and more preferably a divalent chain-shaped hydrocarbon group. The number of carbon atoms of $R^{10}$ is preferably 1 to 20, more preferably 1 to 10, and still more preferably 1 to 5.

Specific examples of the compound (B-2) include compounds respectively represented by the following formulas (c-1-1) to (c-1-32), and so on. These compounds (B-2) may be used either alone or in combination.

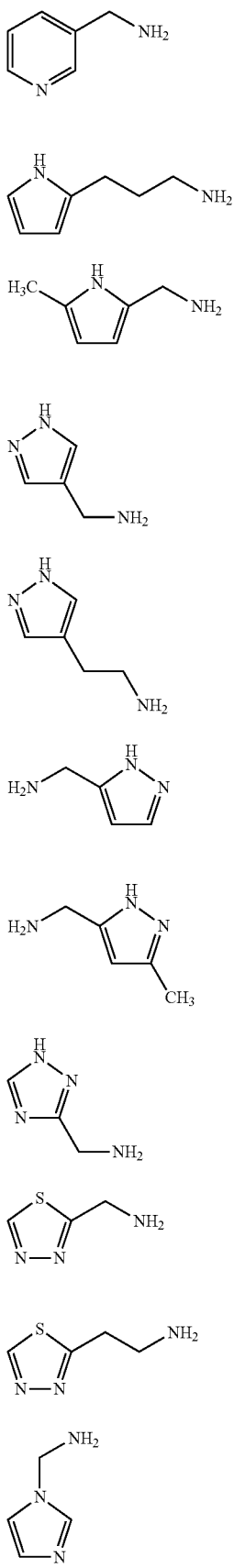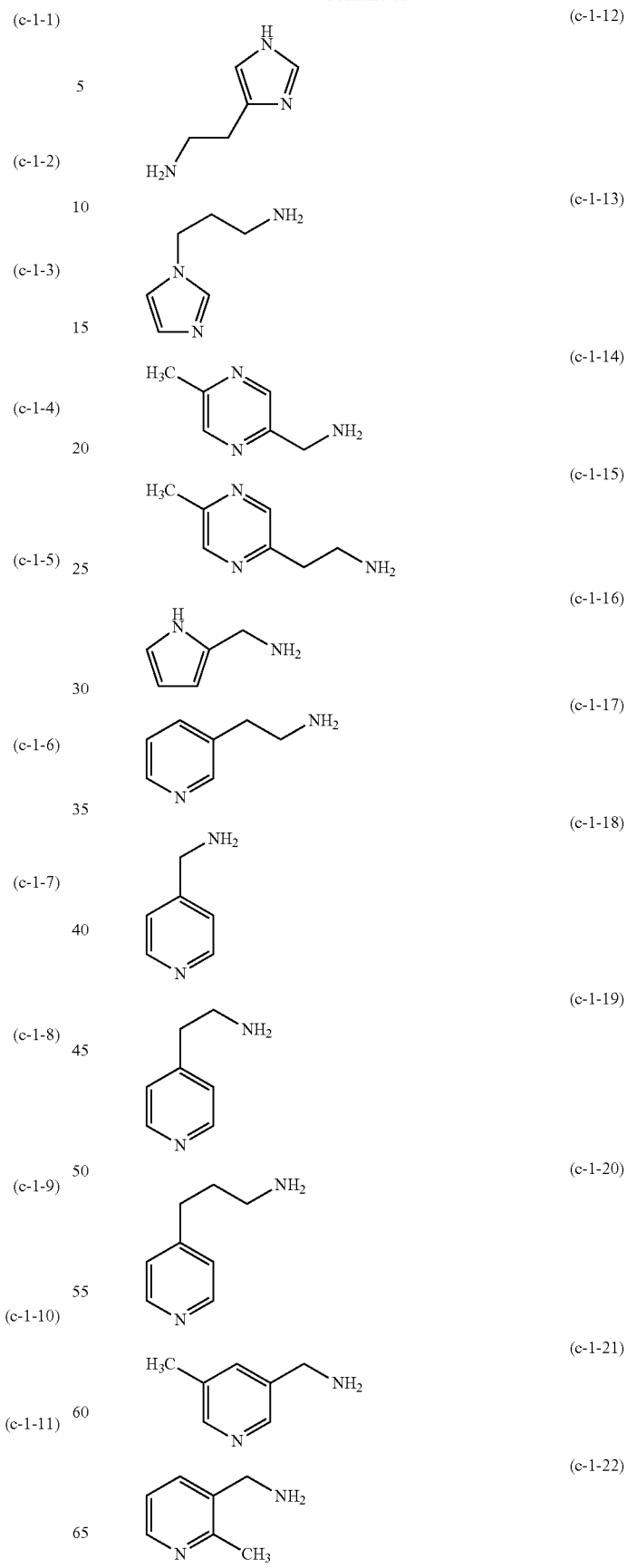

-continued

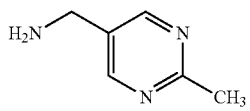
(c-1-23)

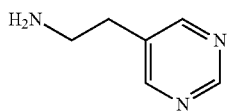
(c-1-24)

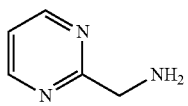
(c-1-25)

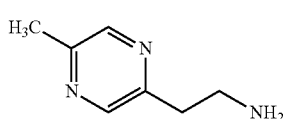
(c-1-26)

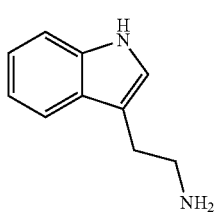
(c-1-27)

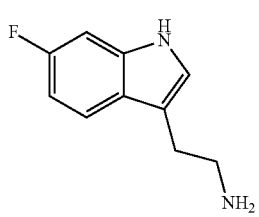
(c-1-28)

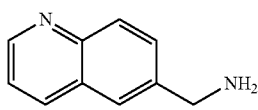
(c-1-29)

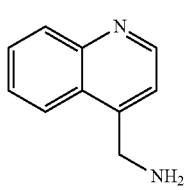
(c-1-30)

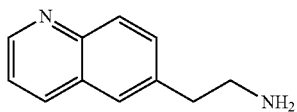
(c-1-31)

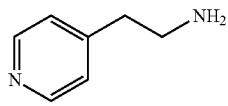
(c-1-32)

It is preferred that the N-containing compound (B) includes the compound (B-1) in order to improve the reliability of the resulting LCD. The compound (B-1) is preferably used in an amount of 30 weight parts or more, more preferably 40 weight parts or more, and still more preferably 50 weight parts or more, based on 100 weight parts of the compound (B-1) and the compound (B-2) in total.

The N-containing compound (B) (the compound (B-1) and the compound (B-2) when the N-containing compound (B) includes them) is normally used in an amount of 0.0001 to 5 weight parts, and preferably 0.001 to 5 weight parts, based on 100 weight parts of the liquid crystalline compound (A) and the N-containing compound (B) in total. When the amount of the N-containing compound (B) is 0.0001 weight parts or more, the reliability of the resulting LCD can be sufficiently improved. When the amount of the N-containing compound (B) is 5 weight parts or less, the stability of the liquid crystal composition can be maintained. The N-containing compound (B) is more preferably used in an amount of 0.01 to 3 weight parts, and still more preferably 0.1 to 2 weight parts.

The liquid crystal composition may optionally include an additional component, of which examples include a photo-reactive monomer (photo-polymerizable compound) and so on.

The photo-polymerizable compound may preferably be used for producing a polymer sustained alignment (PSA)-mode LCD using the liquid crystal composition. A compound that includes a radically polymerizable functional group (e.g., acryloyl, methacryloyl, or vinyl) may be used as the photo-polymerizable compound. It is preferred to use a polyfunctional compound that includes acryloyl groups or methacryloyl groups from the viewpoint of reactivity. It is preferred that the photo-polymerizable compound have a liquid crystal skeleton in view of stably maintaining the orientation of the liquid crystal molecules. More specifically, it is preferred to use a compound having a skeleton that includes at least two or more cyclohexane rings or two or more benzene rings. A known compound may be used as the photo-polymerizable compound. The photo-polymerizable compound is preferably used in a proportion of 0.1 to 0.5 wt % based on the total amount of the liquid crystalline compound.

Further examples of the additional component include a chiral agent (e.g., C-15 and CB-15 from Merck), an antioxidant, a UV absorbent, a pigment and an antifoaming agent, etc.

The liquid crystal composition is prepared by mixing the liquid crystalline compound (A), the N-containing compound (B), and an optional additional component. The components may be mixed at room temperature, or may be mixed while increasing the temperature of the mixture. Each component may be dissolved in an organic solvent (e.g., acetone, chloroform, or methanol), and the solvent may be removed by distillation or the like.

LCD and Method for Producing the Same

The LCD may be produced using the liquid crystal composition prepared as described above. The LCD is not particularly limited in the operation mode, and may be applied to various operation modes such as a TN mode, an STN mode, an IPS mode, an FFS mode, a VA mode, and an MVA mode. The LCD is preferably applied to a vertical alignment mode (VA mode or MVA mode). The LCD may be produced by a method that includes the following steps (1) and (2), for example.

Step (1): Formation of Film

In the step (1), the liquid crystal aligning agent is applied to a surface of each of a pair of substrates, and heated to form a film on the surface of each of the pair of substrates.

(1-1) When producing a TN-, STN-, VA-, or MVA-mode LCD, a pair of substrates on which a patterned transparent conductive film is formed is provided, and the liquid crystal aligning agent is applied to the surface of each substrate on which the transparent conductive film is formed (preferably using an offset printing method, a spin coating method, a roll coating method, or an inkjet printing method). The substrate may be a transparent substrate formed of glass (e.g., float glass or soda glass) or a plastic (e.g., polyethylene terephthalate, polybutylene terephthalate, polyethersulfone, polycarbonate, or poly(alicyclic olefin)). The transparent conductive film formed on the surface of the substrate may be a NESA film ("NESA" is a registered trademark of PPG Industries (USA)) formed of tin oxide ($SnO_2$), an ITO film formed of indium oxide-tin oxide ($In_2O_3$—$SnO_2$), or the like. The patterned transparent conductive film may be obtained by forming an unpatterned transparent conductive film and patterning the same by photolithography and etching, or by utilizing a mask having a desired pattern when forming a transparent conductive film. A functional silane compound or a functional titanium compound, etc., may be applied to the surface of the substrate on which a film is to be formed before applying the liquid crystal aligning agent, for improving adhesion between the surface of the substrate (transparent conductive film) and the resulting film.

The liquid crystal aligning agent is preferably a liquid composition in which a polymer component is dispersed or dissolved in an appropriate solvent, and is described in details later.

(1-2) In producing an IPS-mode or FFS-mode LCD, the liquid crystal aligning agent is applied to the surface of a substrate on which a comb-like patterned electrode (transparent conductive film or metal film) is formed, and the surface of a common substrate on which an electrode is not formed, and heated to form a film. The material for forming the substrate, the material for forming the transparent conductive film, the application (coating) method, the heating conditions after the application, the transparent conductive film/metal film patterning method, the substrate pretreatment, and a preferred thickness of the film are the same as above (see (1-1)). A film formed of a metal such as Cr may be used as the metal film.

After applying the liquid crystal aligning agent to the substrate (see (1-1) and (1-2)), the organic solvent is removed by a heating treatment. A film used as a liquid crystal alignment film (or used to form a liquid crystal alignment film) is thus formed. After the aligning agent is applied, it is preferably prebaked to prevent it from dripping, for example. The prebaking temperature is preferably 30 to 200° C., more preferably 40 to 150° C., and particularly preferably 40 to 100° C. The prebaking time is preferably 0.25 to 10 min and more preferably 0.5 to 5 min. The liquid crystal aligning agent is then post-baked to completely remove the solvent and optionally effect thermal imidization of the amic acid structure in the polymer. The post-baking temperature is preferably 80 to 300° C., and more preferably 120 to 250° C. The post-baking time is preferably 5 to 200 min and more preferably 10 to 100 min. The thickness of the film thus formed is preferably 0.001 to 1 μm, and more preferably 0.005 to 0.5 μm.

When the polymer included in the liquid crystal aligning agent is a polyamic acid, a polyamic ester, or a partially imidized polymer that includes an imide ring structure and an amic acid structure, the film may be further heated to effect a dehydration/ring-closing reaction to obtain an imidized film.

Alignment Capability-Providing Treatment

When producing a TN-, STN-, IPS-, or FFS-mode LCD, the film formed by the step (1) is subjected to an alignment capability-providing treatment and thus provided with a liquid crystal molecule alignment capability to obtain a liquid crystal alignment film. For example, the film is rubbed in a given direction with a roll around which a fiber cloth (e.g., nylon, rayon or cotton) is wound (rubbing treatment), or subjected to a photo-alignment treatment. When producing a vertical alignment-mode LCD, the film formed by the step (1) may be used directly as the liquid crystal alignment film. It is noted that the film may be subjected to the rubbing treatment or the photo-alignment treatment. The liquid crystal alignment film subjected to the rubbing treatment may be subjected to a treatment that changes the pretilt angle of part of the liquid crystal alignment film by applying UV rays to a part of the liquid crystal alignment film, or may be subjected to a treatment that forms a resist film on a part of the surface of the liquid crystal alignment film, subjects the liquid crystal alignment film to the rubbing treatment in a direction differing from that of the previous rubbing treatment, and then removes the resist film so that the liquid crystal alignment film has a different liquid crystal alignment capability depending on the area. In this case, the viewing characteristics of the resulting LCD can be improved.

Step (2): Production of Cell (2-1) Two substrates (a pair of substrates) on which the liquid crystal alignment film is formed as described above are provided, and a liquid crystal cell in which the pair of substrates are disposed so that the liquid crystal alignment films face each other with the liquid crystal layer in between. The liquid crystal cell may be produced using the following first or second method, for example. The first method is a known method. Specifically, the (two) substrates are disposed with a cell gap so that the liquid crystal alignment films face each other, and are bonded in the peripheral area using a sealant. After filling the cell gap defined by the surface of the substrate and the sealant with the liquid crystal composition, the injection hole is sealed to produce a liquid crystal cell. The second method utilizes a one-drop-fill (ODF) technique. Specifically, a UV-curable sealant is applied to a given area of one of the (two) substrates on which the liquid crystal alignment film is formed, for example. After dropping the liquid crystal composition onto given areas of the liquid crystal alignment film, the substrates are bonded so that the liquid crystal alignment films face each other. After spreading the liquid crystal over the entire surface of the substrate, the sealant is cured by applying UV light to the entire surface of the substrate to produce a liquid crystal cell. When using the first or second method, it is desired to heat the liquid crystal cell up to a temperature at which the liquid crystal is in an isotropic phase, and gradually cool the liquid crystal cell to room temperature to remove the flow alignment of the liquid crystal that has occurred during filling. Epoxy resin including a curing agent and aluminum oxide balls (spacers) may be used as the sealant. The thickness of the liquid crystal layer formed using the liquid crystal composition is preferably 1 to 5 μm.

(2-2) When performing a PSA treatment, the liquid crystal cell is produced in the same manner as described above (see (2-1)), except that a photo-polymerizable compound is injected or dripped together with the liquid crystalline compound. When producing a vertical electric field-mode LCD (e.g., vertical alignment mode, TN mode, or STN mode), light is applied to the liquid crystal cell while voltage is applied between the conductive films of the pair of substrates. When producing a lateral electric field-mode LCD, light is applied to the liquid crystal cell in a state that no voltage is applied between the conductive films of the pair of substrates.

A direct-current or alternating-current voltage of 5 to 50 V may be applied between the conductive films, for example. UV light or visible light including light having a wavelength of 150 to 800 nm may be used as the light applied to the liquid crystal cell. It is preferred to use UV light including light having a wavelength of 300 to 400 nm. A low-pressure mercury lamp, a high-pressure mercury lamp, a deuterium lamp, a metal halide lamp, an argon resonance lamp, a xenon lamp, or an excimer laser, etc., may be used as a light source. UV light having the above preferred wavelength region may be obtained using the light source in combination with a filter, or a diffraction grating, etc., for example. The dose is preferably 1000 J/m² or more and less than 200,000 J/m², and more preferably 1000 to 100,000 J/m².

A polarizer is bonded to the outer surface of the liquid crystal cell to produce the LCD. Examples of the polarizer that is bonded to the outer surface of the liquid crystal cell include a polarizer in which a polarizing film (H film) obtained by stretching polyvinyl alcohol while effecting absorption of iodine is interposed between cellulose acetate protective films, and a polarizer formed of an H film. When the film has been subjected to the rubbing treatment, the substrates are disposed to face each other so that the rubbing directions of the films form a given angle (e.g., orthogonal or antiparallel).

Liquid Crystal Aligning Agent

The liquid crystal aligning agent used for the method for producing an LCD is described in detail below. It is preferred that the liquid crystal aligning agent includes at least one polymer (P) selected from the group consisting of a polyamic acid, a polyamic ester, and a polyimide as a polymer component.

Polyamic Acid

The polyamic acid used as the polymer (P) may be obtained by reacting a tetracarboxylic dianhydride with a diamine, for example.

<Tetracarboxylic Dianhydride>

Examples of the tetracarboxylic dianhydride used to synthesize the polyamic acid include aliphatic tetracarboxylic dianhydrides, alicyclic tetracarboxylic dianhydrides, and aromatic tetracarboxylic dianhydrides, etc. At least one compound selected from the group consisting of 2,3,5-tricarboxycyclopentylacetic dianhydride, bicyclo[3.3.0]octane-2,4,6,8-tetracarboxylic 2:4,6:8-dianhydride, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-5-(tetrahydro-2,5-dioxo-3-furanyl)-naphtho[1,2-c]furan-1,3-dione, 1,2,3,4-cyclobutanetetracarboxylic dianhydride, cyclopentanetetracarboxylic dianhydride, cyclohexanetetracarboxylic dianhydride, pyromellitic dianhydride, and bicyclo[2.2.1]heptane-2,3,5,6-tetracarboxylic 2:3,5:6-dianhydride (may be referred to as "specific tetracarboxylic dianhydride" hereinafter) may preferably be used as the tetracarboxylic dianhydride used to synthesize the polyamic acid. Further examples of the tetracarboxylic dianhydride that may be used to synthesize the polyamic acid include the tetracarboxylic dianhydrides disclosed in Japanese Patent Application Publication No. 2010-97188, and so on. These tetracarboxylic dianhydrides may be used either alone or in combination.

The specific tetracarboxylic dianhydride is preferably used in a proportion of 30 mol % or more, more preferably 40 to 100 mol %, and still more preferably 50 to 100 mol %, based on the total amount of the tetracarboxylic dianhydride used to synthesize the polyamic acid.

<Diamine>

Examples of the diamine used to synthesize the polyamic acid include aliphatic diamines, alicyclic diamines, aromatic diamines, and diaminoorganosiloxanes, etc. An aromatic diamine may preferably be used as the diamine. Specific examples of the aromatic diamine include p-phenylenediamine, 4,4'-diaminodiphenylmethane, 2,2'-dimethyl-4,4'-diaminobiphenyl, 4,4'-diaminodiphenyl ether, 4-aminophenyl 4'-aminobenzoate, 2,2-bis[4-(4-aminophenoxy)phenyl]-hexafluoropropane, 2,2-bis(4-aminophenyl)hexafluoropropane, 1,4-bis(4-aminophenoxy)-benzene, 4,4'-bis(4-aminophenoxy)biphenyl, 1-(4-aminophenyl)-2,3-dihydro-1,3,3-trimethyl-1H-indene-5-amine, 3,5-diaminobenzoic acid, cholestenyloxydiaminobenzene, cholestanyloxy-diaminobenzene, cholestanyl diaminobenzoate, 3,6-bis(4-aminobenzoyloxy)cholestane, 3,6-bis(4-aminophenoxy)cholestane, and compounds represented by formula (D-1) below, etc.

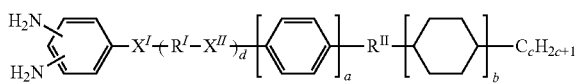

(D-1)

wherein $X^I$ and $X^{II}$ are independently a single bond, —O—, —COO—, or —COO—, $R^I$ and $R^{II}$ are independently an alkanediyl group having 1 to 3 carbon atoms, a is 0 or 1, b is an integer of 0 to 2, c is an integer of 1 to 20, and d is 0 or 1, provided that a case where a and b are 0 is excluded.

Further examples of the diamine that may be used to synthesize the polyamic acid include the diamines disclosed in Japanese Patent Application Publication No. 2010-97188, and so on. These diamines may be used either alone or in combination.

The divalent group represented by —$X^I$—($R^I$—$X^{II}$)$_n$— in the formula (D-1) is preferably an alkanediyl group having 1 to 3 carbon atoms, *—O—, *—COO—, or *—O—$C_2H_4$—O— (being bonded to the diaminophenyl group through the bond indicated by *). Specific examples of the group represented by —$C_cH_{2c+1}$ include methyl, ethyl, propyl, butyl, pentyl, hexyl, heptyl, octyl, nonyl, decyl, dodecyl, tridecyl, tetradecyl, pentadecyl, hexadecyl, heptadecyl, octadecyl, nonadecyl, eicosyl, and so on. The group represented by —$C_cH_{2c+1}$ is preferably straight. The bonding positions of the two amino groups included in the diaminophenyl group are preferably the 2,4-positions or the 3,5-positions relative to the group represented by $X^I$.

Specific examples of the compound represented by formula (D-1) include compounds respectively represented by the following formulas (D-1-1) to (D-1-5), and so on.

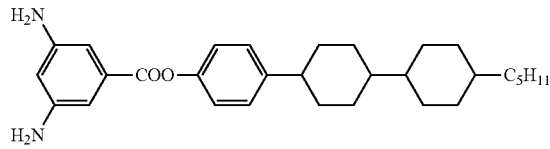

(D-1-1)

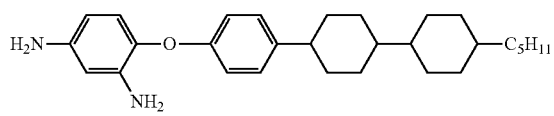

(D-1-2)

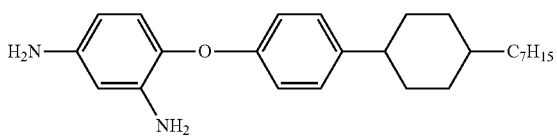

(D-1-3)

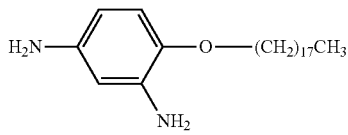
(D-1-4)

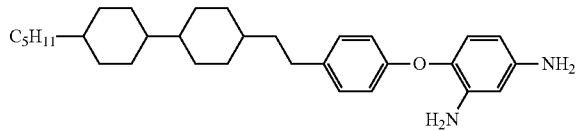
(D-1-5)

It is preferred that the diamine used to synthesize the polyamic acid include a diamine that includes a carboxyl group (hereinafter may be referred to as "carboxyl group-containing diamine"). It is preferred that the carboxyl group-containing diamine is an aromatic diamine. Specific examples of the carboxyl group-containing diamine include 3,5-diaminobenzoic acid, 2,4-diaminobenzoic acid, 2,5-diaminobenzoic acid, 4,4'-diaminobiphenyl-3,3'-dicarboxylic acid, 4,4'-diaminobiphenyl-2,2'-dicarboxylic acid, 3,3'-diaminobiphenyl-4,4'-dicarboxylic acid, 3,3'-diaminobiphenyl-2,4'-dicarboxylic acid, 4,4'-diaminodiphenylmethane-3,3'-dicarboxylic acid, 4,4'-diaminobiphenyl-3-carboxylic acid, 4,4'-diaminodiphenylmethane-3-carboxylic acid, 4,4'-diaminodiphenylethane-3,3'-dicarboxylic acid, 4,4'-diaminodiphenylethane-3-carboxylic acid, 4,4'-diaminodiphenyl ether-3,3'-dicarboxylic acid, 4,4'-diaminodiphenyl ether-3-carboxylic acid, and so on.

The carboxyl group-containing diamine is preferably used in a proportion of 10 mol % or more, more preferably 20 to 90 mol %, and still more preferably 30 to 80 mol %, based on the total amount of the diamine used to synthesize the polyamic acid.

When synthesizing the polyamic acid, an appropriate molecular weight modifier may be used together with the tetracarboxylic dianhydride and the diamine to synthesize a terminal-modified polymer. Examples of the molecular weight modifier include acid monoanhydrides such as maleic anhydride and phthalic anhydride; monoamine compounds such as aniline and an alkylamine, monoisocyanate compounds such as phenyl isocyanate, and so on.

The molecular weight modifier is preferably used in an amount of 20 weight parts or less, and more preferably 10 weight parts or less, based on 100 weight parts of the tetracarboxylic dianhydride and the diamine in total.

Synthesis of Polyamic Acid

The tetracarboxylic dianhydride and the diamine used to synthesize the polyamic acid are preferably used so that the amount of the acid anhydride groups of the tetracarboxylic dianhydride is 0.2 to 2 equivalents, and more preferably 0.3 to 1.2 equivalents, based on 1 equivalent of the amino groups of the diamine. The polyamic acid is preferably synthesized in an organic solvent. The reaction temperature is preferably −20 to 150° C., and more preferably 0 to 100° C. The reaction time is preferably 0.1 to 24 hours, and more preferably 0.5 to 12 hours.

Examples of the solvent used for the reaction include: aprotic polar solvents, such as N-methyl-2-pyrrolidone and 1,3-dimethyl-2-imidazolidinone; phenol-based solvents, such as phenol and m-cresol; alcohols, such as isopropyl alcohol and propylene glycol; ketones, such as acetone and methyl ethyl ketone; esters, such as methyl acetate and butyl acetate; ethers, such as ethyleneglycol methyl ether and ethyleneglycol n-butyl ether; halogenated hydrocarbons such as dichloromethane and 1,2-dichloroethane; hydrocarbons such as hexane and octane; and so on.

A reaction solution in which the polyamic acid is dissolved is thus obtained. The reaction solution may be used directly to prepare the liquid crystal aligning agent, or the polyamic acid isolated from the reaction solution may be used to prepare the aligning agent, or the polyamic acid isolated from the reaction solution and then purified may be used to prepare the aligning agent. The polyamic acid may be isolated and purified using a known method.

Polyamic Ester

The polyamic ester used as polymer (P) may be synthesized by [I] reacting the polyamic acid (P) obtained as above with a hydroxyl-containing compound, a halide, an epoxy-containing compound, or the like (hereinafter called "method [I]"), or [II] reacting a tetracarboxylic diester with a diamine (hereinafter called "method [II]"), or [III] reacting a tetracarboxylic diester dihalide with a diamine (hereinafter called "method [III]"), for example.

Examples of the hydroxyl-containing compound used for the method [I] include alcohols such as methanol, ethanol, and propanol; phenols such as phenol and cresol; and so on. Examples of the halide used for the method [I] include methyl bromide, ethyl bromide, stearyl bromide, methyl chloride, stearyl chloride, and 1,1,1-trifluoro-2-iodoethane, etc. Examples of the epoxy-containing compound used for the method [I] include propylene oxide and so on.

The tetracarboxylic diester used for the method [II] may be obtained by subjecting the tetracarboxylic dianhydride mentioned above in connection with synthesis of the polyamic acid to a ring-opening reaction using the above alcohol, for example. The reaction employed in the method [II] is preferably effected in presence of a suitable dehydration catalyst. Examples of the dehydration catalyst include 4-(4,6-dimethoxy-1,3,5-triazin-2-yl)-4-methylmorpholinium halide, carbonylimidazole and phosphorus-based condensation agents, etc. The tetracarboxylic diester dihalide used for the method [III] may be obtained by reacting the tetracarboxylic diester obtained as above with an appropriate chlorinating agent such as thionyl chloride, for example.

Examples of the diamine used for the methods [II] and [III] include those mentioned above in connection with the diamine used to synthesize the polyamic acid. It is noted that the polyamic ester may include only an amic ester structure, or may be a partially esterified product that includes an amic acid structure and an amic ester structure.

Polyimide

The polyimide used as the polymer (P) included in the liquid crystal aligning agent may be obtained by subjecting the polyamic acid (P) synthesized as above to a dehydration/ring-closing reaction to effect imidization.

The polyimide may be a completely imidized product obtained by subjecting all of the amic acid structures of the polyamic acid (precursor) to a dehydration/ring-closing reaction, or may be a partially imidized product obtained by subjecting only some amic acid structures of the polyamic acid to a dehydration/ring-closing reaction, and including an auric acid structure and an imide ring structure. The degree of imidization of the polyimide is preferably 30% or more, more preferably 40 to 99%, and still more preferably 50 to 99%, in order to increase the voltage holding ratio. The degree of imidization (%) refers to the ratio of the number of imide ring structures included in the polyimide to the sum of the number of auric acid structures and the number of imide ring structures. Some of the imide rings may be an isoimide ring.

The polyamic acid is preferably subjected to a dehydration/ring-closing reaction by heating the polyamic acid, or by dissolving the polyamic acid in an organic solvent and adding a dehydrating agent and a dehydration/ring-closing catalyst to the solution, followed by optional heating. It is preferred to use the latter method.

Examples of the dehydrating agent added to the solution of the polyamic acid to effect imidization include: acid anhydrides, such as acetic anhydride, propionic anhydride, and trifluoroacetic anhydride. The dehydrating agent is preferably used in an amount of 0.01 to 20 mol based on 1 mol of the auric acid structures included in the polyamic acid. Examples of the dehydration/ring-closing catalyst include: tertiary amines, such as pyridine, collidine, lutidine, and triethylamine. The dehydration/ring-closing catalyst is preferably used in an amount of 0.01 to 10 mol based on 1 mol of the dehydrating agent. Examples of the organic solvent used for the dehydration/ring-closing reaction include those mentioned above in connection with the organic solvent used to synthesize the polyamic acid. The dehydration/ring-closing reaction temperature is preferably 0 to 180° C., and more preferably 10 to 150° C. The dehydration/ring-closing reaction time is preferably 1.0 to 120 hours, and more preferably 2.0 to 30 hours.

A reaction solution that includes the polyimide is thus obtained. The reaction solution may be used directly to prepare the liquid crystal aligning agent, or the reaction solution may be used to prepare the liquid crystal aligning agent after removing the dehydrating agent and the dehydration/ring-closing catalyst from the reaction solution, or the polyimide isolated from the reaction solution may be used to prepare the liquid crystal aligning agent, or the polyimide isolated from the reaction solution and then purified may be used to prepare the liquid crystal aligning agent. The purification operation may be performed using a known method.

It is preferred that a 10 wt % solution of polymer (P) obtained as above has a viscosity of 10 to 800 mPa·s, more preferably 15 to 500 mPa·s. It is noted that the viscosity (mPa·s) of the solution of the polymer refers to the viscosity (measured at 25° C. using an E-type rotational viscometer) of a 10 wt % polymer solution prepared using a good solvent (e.g., γ-butyrolactone or N-methyl-2-pyrrolidone) for the polymer.

The polystyrene-reduced weight average molecular weight of the polymer (P) determined by gel permeation chromatography (GPC) is preferably 500 to 100,000, and more preferably 1000 to 50,000.

The liquid crystal aligning agent may optionally include an additional component. Examples of the additional component include an additional polymer (e.g., polyorganosiloxane, polyester, or polyamide) other than the polymer (P), a compound including at least one epoxy group in the molecule, a functional silane compound, a compound including at least one oxetanyl group in the molecule, an antioxidant, and so on.

Solvent

The liquid crystal aligning agent is prepared in the form of a liquid composition in which the polymer (P) and an optional additional component are preferably dispersed or dissolved in an appropriate solvent (organic solvent).

Examples of the organic solvent include N-methyl-2-pyrrolidone, γ-butyrolactone, γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol i-propyl ether, ethylene glycol n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, diisobutyl ketone, isoamyl propionate, isoamyl isobutyrate, diisopentyl ether, ethylene carbonate, propylene carbonate, and so on. These organic solvents may be used either alone or in combination.

The solid content (i.e., the ratio of the total weight of the components other than the solvent to the total weight of the liquid crystal aligning agent) in the liquid crystal aligning agent is appropriately selected taking account of the viscosity, the volatility and so on of the liquid crystal aligning agent, but is preferably 1 to 10 wt %. If the solid content is less than 1 wt %, the resulting film may have too small a thickness, and a good liquid crystal alignment film may not be obtained. If the solid content exceeds 10 wt %, the resulting film may have too large a thickness, and a good liquid crystal alignment film may not be obtained. Moreover, the liquid crystal aligning agent may exhibit poor applicability due to an increase in viscosity.

A particularly preferred solid content range differs depending on the method used to apply the liquid crystal aligning agent to the substrate. For example, when applying the liquid crystal aligning agent to the substrate with a spinner method, it is particularly preferred to adjust the solid content to 1.5 to 4.5 wt %. When applying the liquid crystal aligning agent to the substrate with a printing method, it is particularly preferred to adjust the solid content to 3 to 9 wt % so that the viscosity of the solution is 12 to 50 mPa·s. When applying the liquid crystal aligning agent to the substrate with an inkjet method, it is particularly preferred to adjust the solid content to 1 to 5 wt % so that the viscosity of the solution is 3 to 15 mPa·s. The aligning agent is preferably prepared at a temperature of 10 to 100° C., more preferably 20 to 80° C.

An LCD produced as above includes a pair of substrates disposed opposite to each other at a given interval, a liquid crystal alignment layer on each of the opposing surfaces of the pair of substrates, and a liquid crystal layer disposed between the liquid crystal alignment layers. The liquid crystal layer included in the LCD includes the liquid crystalline compound (A) and the N-containing compound (B). The LCD may effectively be applied to various devices. For example, the LCD may be used as a display for a clock, a portable game device, a word processor, a notebook-sized personal computer, a car navigation system, a camcorder, a PDA, a digital camera, a mobile phone, a smartphone, a monitor, or an LCD TV, etc.

EXAMPLES

The invention is further described below by way of examples, but is not limited to them.

The degree of imidization of the polyimide included in the polymer solution and the viscosity of the polymer solution were measured using the following methods.

<Degree of Imidization of Polyimide>

A solution of the polyimide was added to purified water. The resulting precipitates were sufficiently dried at room temperature under a reduced pressure, and dissolved in deuterated dimethyl sulfoxide. The solution was subjected to $^1$H-NMR analysis at room temperature (standard: tetramethylsilane). The degree of imidization (%) was calculated from the resulting $^1$H-NMR spectrum using the following expression (1).

$$\text{Degree of imidization}(\%)=(1-A^1/A^2\times\alpha)\times100 \quad (1)$$

where $A^1$ is a peak area attributed to the proton of an NH group that appears at about 10 ppm of the chemical shift, $A^2$ is a peak area attributed to other protons, and $\alpha$ is the ratio of the number of other protons to one proton of an NH group in the polymer precursor (polyamic acid).

<Viscosity of Polymer Solution>

The viscosity (mPa·s) of the polymer solution (i.e., a 10 wt % polymer solution prepared using a specific solvent) was measured at 25° C. using an E-type rotational viscometer.

Synthesis of Polymer

Synthesis Example 1

Synthesis of Polyimide (PI-1)

22.5 g (0.1 mol) of 2,3,5-tricarboxycyclopentylacetic dianhydride as a tetracarboxylic dianhydride, 10.7 g (0.07 mol) of 3,5-diaminobenzoic acid as a diamine, 7.35 g (0.015 mol) of cholestanyloxy-2,4-diaminobenzene as a diamine, and 6.94 g (0.015 mol) of the compound represented by the formula (D-1-5) as a diamine were dissolved in 190 g of N-methyl-2-pyrrolidone (NMP), and reacted at 60° C. for 6 hours to obtain a 20 wt % polyamic acid solution. A small amount of the polyamic acid solution was collected preparatively, and NMP was added to the collected polyamic acid solution to prepare a 10 wt % polyamic acid solution. The viscosity of the 10 wt % polyamic acid solution was measured, and found to be 80 mPa·s.

After the addition of NMP to the polyamic acid solution to prepare a 7 wt % polyamic acid solution, 15.7 g of pyridine and 20.3 g of acetic anhydride were added thereto, and a dehydration/ring-closing reaction was effected at 110° C. for 4 hours. After completion of the dehydration/ring-closing reaction, the solvent included in the system was replaced with NMP to obtain a 26 wt % solution of a polyimide (PI-1) having a degree of imidization of about 80%. A small amount of the polyimide solution was collected preparatively, and NMP was added to the collected polyimide solution to prepare a 10 wt % polyimide solution. The viscosity of the wt % polyimide solution was measured, and found to be 40 mPa·s.

Synthesis Example 2

Synthesis of Polyimide (PI-2)

18.7 g (0.075 mol) of 2,4,6,8-tetracarboxybicyclo[3.3.0]octane-2:4, 6:8-dianhydride as a tetracarboxylic dianhydride, 4.90 g (0.025 mol) of 1,2,3,4-cyclobutanetetracarboxylic dianhydride as a tetracarboxylic dianhydride, 10.7 g (0.07 mol) of 3,5-diaminobenzoic acid as a diamine, and 13.1 g (0.03 mol) of 1,3-diamino-4-{4-[trans-4-n-pentylcyclohexyl]cyclohexyl]-phenoxy}benzene [the compound represented by formula (D-1-2)] as a diamine were dissolved in 190 g of NMP, and reacted at 60° C. for 6 hours to obtain a 20 wt % polyamic acid solution. A small amount of the polyamic acid solution was collected preparatively, and NMP was added to the collected polyamic acid solution to prepare a 10 wt % polyamic acid solution. The viscosity of the 10 wt % polyamic acid solution was measured, and found to be 85 mPa·s.

After the addition of NMP to the polyamic acid solution to prepare a 7 wt % polyamic acid solution, 9.5 g of pyridine and 12.3 g of acetic anhydride were added thereto, and a dehydration/ring-closing reaction was effected at 110° C. for 4 hours. After completion of the dehydration/ring-closing reaction, the solvent included in the system was replaced with NMP to obtain a 26 wt % solution of a polyimide (PI-2) having a degree of imidization of about 65%. A small amount of the polyimide solution was collected preparatively, and NMP was added to the collected polyimide solution to prepare a 10 wt % polyimide solution. The viscosity of the 10 wt % polyimide solution was measured, and found to be 45 mPa·s.

Preparation of Liquid Crystal Aligning Agent

Preparation Example 1

Preparation of Liquid Crystal Aligning Agent (S1)

NMP and butyl cellosolve (BC) were added to the solution of the polyimide (PI-1) obtained in Synthesis Example 1 to prepare a solution [NMP:BC=50:50 (weight ratio)] having a solid content of 6.0 wt %. The solution was filtered through a filter having a pore size of 1 micrometer to prepare a liquid crystal aligning agent (S1).

Preparation Example 2

Preparation of Liquid Crystal Aligning Agent (S2)

A liquid crystal aligning agent was prepared in the same manner as in Preparation Example 1, except that the polyimide (PI-2) was used instead of the polyimide (PI-1). The liquid crystal aligning agent thus prepared is referred to as "liquid crystal aligning agent (S2)".

Example 1

Preparation of Liquid Crystal Composition 89.5 weight parts of a nematic liquid crystal ("MLC-6608" produced by Merck) as a liquid crystalline compound (A), 10 weight parts of the compound (alkenyl-based liquid crystal) represented by the following formula (L1-1-1) as a liquid crystalline compound (A), and 0.5 weight parts of 3-aminomethylpyridine (N-containing compound (B)) were mixed to prepare a liquid crystal composition LC1.

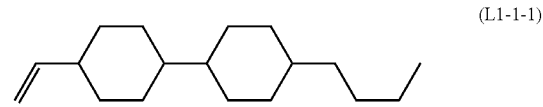

(L1-1-1)

Production of Liquid Crystal Cell

The liquid crystal aligning agent (S1) prepared as above was applied to the surface of a transparent electrode (ITO film) formed on a glass substrate using a liquid crystal alignment film printer (made by Nissha Printing Co., Ltd.). After removing the solvent by heating (prebaking) the liquid crystal aligning agent on a hot plate at 80° C. for 1 min, the liquid crystal aligning agent was heated (post-baked) on a hot plate at 210° C. for 10 min to form a film having an average thickness of 80 nm. The film was subjected to ultrasonic cleaning for 1 min in ultrapure water, and dried in a clean oven at 100° C. for 10 min. The above operation was repeated to obtain a pair of substrates on which a liquid crystal alignment film was formed.

An epoxy resin adhesive including aluminum oxide balls having a diameter of 5.5 μm was applied to the outer edge of the surface of each substrate (on which the liquid crystal alignment film was formed), the substrates were placed one on top of another with the liquid crystal alignment films facing each other and were compression-bonded, and the adhesive was cured. The liquid crystal composition LC1 prepared as above was injected into the space between the pair of substrates through a liquid crystal injection port, and the injection port was sealed using an acrylic-based photo-curable adhesive to produce a liquid crystal cell.

Evaluation of Reliability

A voltage of 5 V was applied to the liquid crystal cell for 60 is within a span of 167 ms, and the voltage holding ratio (VHR1) was measured when 167 ms had elapsed after stopping the application of the voltage. The liquid crystal cell was allowed to stand in an oven at 80° C. for 200 hours while applying light emitted from an LED lamp, and then allowed to cool to room temperature. After the cooling, a voltage of 5 V was applied to the liquid crystal cell for 60 us within a span of 167 ms, and the voltage holding ratio (VHR2) was measured when 167 ms had elapsed after stopping the application of the voltage. The voltage holding ratio was measured using a device "VHR-1" (made by Toyo Corporation). The VHR change ratio (ΔVHR) was calculated using the following equation (2), and the reliability of the liquid crystal cell was evaluated based on the VHR change ratio (ΔVHR).

$$\Delta VHR(\%) = (VHR1 - VHR2)/(VHR1) \times 100 \quad (2)$$

The reliability of the liquid crystal cell was evaluated as "Acceptable" when the VHR change ratio (ΔVHR) was 2% or less, and evaluated as "Unacceptable" when the VHR change ratio (ΔVHR) was more than 2%. The VHR change ratio (ΔVHR) of the liquid crystal cell of Example 1 was 0.8% ("Acceptable").

Examples 2 and 4 to 6 and Comparative Example 1

A liquid crystal cell was produced in the same manner as in Example 1, except that the type of the liquid crystal aligning agent and the composition of the liquid crystal composition were changed as shown in Table 1. The reliability of the liquid crystal cell was evaluated in the same manner as in Example 1. The results are shown in Table 1.

TABLE 1

| | Liquid crystal aligning agent Polymer (P) | Liquid crystal composition | | | Evaluation of reliability | |
|---|---|---|---|---|---|---|
| | | Liquid crystalline compound (A) (weight part) | Compound (B) (weight part) | Photo-polymerizable compound | ΔVHR (%) | Evaluation |
| Example 1 | PI-1 | MLC-6608 (89.5) L1-1-1 (10) | c-1-1 (0.5) | — | 0.8 | Acceptable |
| Example 2 | PI-1 | MLC-6608 (89.5) L1-1-1 (10) | m-1-1 (0.5) | — | 0.7 | Acceptable |
| Example 3 | PI-1 | MLC-6608 (89) L1-1-1 (10) | m-1-1 (1) | L2-1 | 0.5 | Acceptable |
| Example 4 | PI-2 | MLC-6608 (89.5) L1-1-1 (10) | m-1-1 (0.5) | — | 0.9 | Acceptable |
| Example 5 | PI-2 | MLC-6608 (89) L1-1-1 (10) | m-1-1 (1) | — | 0.6 | Acceptable |
| Example 6 | PI-2 | MLC-6608 (79) L1-1-1 (20) | m-1-1 (1) | — | 1.3 | Acceptable |
| Comparative Example 1 | PI-2 | MLC-6608 (90) L1-1-1 (10) | — | — | 5.4 | Unacceptable |
| Comparative Example 2 | PI-2 | MLC-6608 (90) L1-1-1 (10) | — | L2-1 | 4.8 | Unacceptable |

In Table 1, the numerical values (in parentheses) corresponding to the liquid crystalline compound (A) and the N-containing compound (B) indicate the amount (weight parts) of each compound based on 100 weight parts of the liquid crystalline compound (A) and the N-containing compound (B) included in the liquid crystal composition in total. The meanings of the abbreviations in Table 1 are shown below.

Liquid Crystalline Compound (A):

L1-1-1: compound represented by the formula (L1-1-1)

Nitrogen-Containing Compound (B):

c-1-1: 3-aminomethylpyridine m-1-1: bis(3-pyridylmethyl)amine

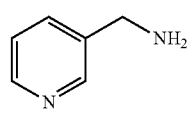

(c-1-1)

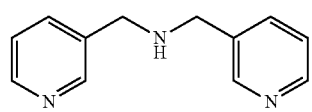

(m-1-1)

Photo-Polymerizable Compound:

L2-1: compound represented by the following formula (L2-1)

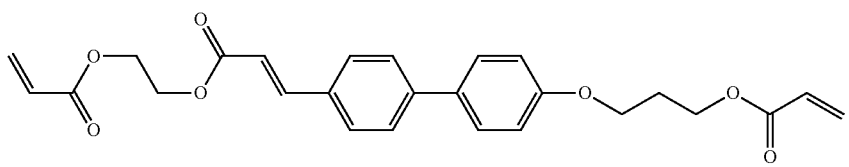

(L2-1)

As shown in Table 1, the liquid crystal Cells using the liquid crystal composition including the N-containing compound (B) showed a small decrease in voltage holding ratio (i.e., exhibited excellent reliability) even after being driven for a long period of time in a light/heat stress environment. On the other hand, the liquid crystal cell of Comparative Example 1 using the liquid crystal composition that did not include the N-containing compound (B) showed a significant decrease in voltage holding ratio after being driven for a long period of time.

Example 3

Preparation of Liquid Crystal Composition 89 weight parts of a nematic liquid crystal ("MLC-6608" from Merck) as a liquid crystalline compound (A), 10 weight parts of the compound represented by formula (L1-1-1) as a liquid crystalline compound (A), and 1 weight part of bis(3-pyridylmethyl)amine as an N-containing compound (B) were mixed. The compound represented by formula (L2-1) as a polymerizable compound was added to the mixture in an amount of 0.3 weight part based on 100 weight parts of the nematic liquid crystal (MLC-6608), and the components were mixed to prepare a liquid crystal composition LC3.

<Production of Liquid Crystal Cell>

The liquid crystal aligning agent (S1) prepared as above was applied to the surface of an ITO electrode that was patterned in the form of slits and divided into a plurality of areas (see FIG. 1) and was formed on each of two glass substrates, using a liquid crystal alignment film printer (made by Nissha Printing Co., Ltd.). After removing the solvent by heating (prebaking) the liquid crystal aligning agent on a hot plate at 80° C. for 1 min, the liquid crystal aligning agent was heated (post-baked) on a hot plate at 210° C. for 10 min to form a film having an average thickness of 800 Å. The film was subjected to ultrasonic cleaning for 1 min in ultrapure water, and dried in a clean oven at 100° C. for 10 min. A pair of substrates on which a film was formed was thus obtained.

An epoxy resin adhesive including aluminum oxide balls having a diameter of 5.5 μm was applied to the outer edge of the surface of each substrate on which the liquid crystal alignment film was formed, and the substrates were placed one on top of another with the liquid crystal alignment films facing each other and were compression-bonded, and the adhesive was cured. The liquid crystal composition LC3 prepared as above was injected into the space between the pair of substrates through a liquid crystal injection port, and the liquid crystal injection port was sealed using an acrylic-based photo-curable adhesive. UV light (λ=365 nm) was applied to the liquid crystal cell from the outside at a dose of 100,000 J/m² in a state in which a voltage was applied between the conductive films.

<Evaluation of Reliability>

The reliability of the liquid crystal cell to which UV light had been applied was evaluated in the same manner as in Example 1. The VHR change ratio (ΔVHR) of the liquid crystal cell of Example 3 was 0.5% ("Acceptable").

Comparative Example 2

A liquid crystal cell was produced in the same manner as in Example 3, except that the composition of the liquid crystal composition was changed as shown in Table 1. The reliability of the liquid crystal cell was evaluated in the same manner as in Example 1. The VHR change ratio (ΔVHR) of the liquid crystal cell of Comparative Example 2 was 4.8% ("Unacceptable").

Obviously, numerous modifications and variations of the invention are possible in light of the above teachings. It is therefore to be understood that within the scope of the appended claims, the invention may be practiced otherwise than as specifically described herein.

What is claimed is:

1. A liquid crystal composition, comprising a liquid crystalline compound (A), and at least one nitrogen-containing compound (B) selected from the group consisting of compounds represented by formula (1) and compounds represented by formula (2),

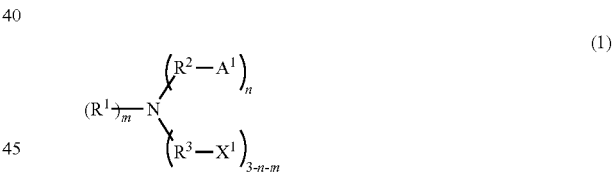

(1)

wherein $R^1$ is a hydrogen atom or a monovalent organic group that is bonded to the nitrogen atom bonded to $R^2$ and $R^3$ via a chain-shaped hydrocarbon group or an alicyclic hydrocarbon group, $R^2$ and $R^3$ are independently a divalent organic group that is bonded to the nitrogen atom bonded to $R^1$ via a chain-shaped hydrocarbon group, an alicyclic hydrocarbon group, or *—CO—$R^4$— (wherein $R^4$ is a divalent chain-shaped hydrocarbon group or a divalent alicyclic hydrocarbon group, and * is a bond to the nitrogen atom bonded to R'), A' is a nitrogen-containing heteroaromatic ring, $X^1$ is a cyclic ether group or a polymerizable unsaturated group, m is 0 or 1, and n is an integer of 1 to 3, provided that m+n≤3 is satisfied, a plurality of $R^2$ are either identical or different when a plurality of $R^2$ are present, a plurality of $R^3$ are either identical or different when a plurality of $R^3$ are present, a plurality of $A^1$ are either identical or different when a plurality of $A^1$ are present, and a plurality of $X^1$ are either identical or different when a plurality of $X^1$ are present, $$H_2N-R^{10}-A^1 \qquad (2)$$

wherein $A^1$ is a nitrogen-containing heteroaromatic ring, and $R^{10}$ is a divalent organic group that is bonded to the primary amino group via a chain-shaped hydrocarbon group or an alicyclic hydrocarbon group.

2. The liquid crystal composition of claim 1, wherein the liquid crystalline compound (A) has an alkenyl structure.

3. The liquid crystal composition of claim 1, which comprises the nitrogen-containing compound (B) in an amount of 0.0001 to 5 weight parts based on 100 weight parts of the liquid crystalline compound (A) and the nitrogen-containing compound (B) in total.

4. A method for producing a liquid crystal display, comprising:
applying a liquid crystal aligning agent to a surface of each of a pair of substrates, and heating the applied liquid crystal aligning agent to form a film; and
disposing the pair of substrates on which the film is formed and a liquid crystal layer so that the films face each other with the liquid crystal layer in between to form a liquid crystal cell, wherein the liquid crystal layer is formed using the liquid crystal composition of claim 1.

5. The method of claim 4, wherein the liquid crystal aligning agent includes at least one polymer (P) selected from the group consisting of a polyamic acid, a polyamic ester, and a polyimide.

6. The method of claim 5, wherein the polymer (P) is obtained by reacting a diamine with at least one compound selected from the group consisting of 2,3,5-tricarboxycyclopentylacetic dianhydride, bicyclo[3.3.0]octane-2,4,6,8-tetracarboxylic 2:4,6:8-dianhydride, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-5-(tetrahydro-2,5-dioxo-3-furanyl)-naphtho[1,2-c]furan-1,3-dione, 1,2,3,4-cyclobutanetetracarboxylic dianhydride, cyclopentanetetracarboxylic dianhydride, cyclohexanetetracarboxylic dianhydride, pyromellitic dianhydride, and bicyclo[2.2.1]heptane-2,3,5,6-tetracarboxylic 2:3,5:6-dianhydride.

7. The method of claim 5, wherein the polymer (P) is obtained by reacting a tetracarboxylic dianhydride with a diamine that includes a carboxyl group-containing diamine.

8. A liquid crystal display, comprising: a pair of substrates disposed opposite to each other at a given interval, liquid crystal alignment layers respectively on opposing surfaces of the pair of substrates, and a liquid crystal layer that is disposed between the liquid crystal alignment layers, and includes a liquid crystalline compound, wherein
the liquid crystal layer includes at least one nitrogen-containing compound (B) selected from the group consisting of compounds represented by formula (1) and compounds represented by a formula (2),

wherein $R^1$ is a hydrogen atom or a monovalent organic group that is bonded to the nitrogen atom bonded to $R^2$ and $R^3$ via a chain-shaped hydrocarbon group or an alicyclic hydrocarbon group, $R^2$ and $R^3$ are independently a divalent organic group that is bonded to the nitrogen atom bonded to $R^1$ via a chain-shaped hydrocarbon group, an alicyclic hydrocarbon group or *—CO—$R^4$— (wherein $R^4$ is a divalent chain-shaped hydrocarbon group or a divalent alicyclic hydrocarbon group, and * is a bond to the nitrogen atom bonded to R'), $A^1$ is a nitrogen-containing heteroaromatic ring, $X^1$ is a cyclic ether group or a polymerizable unsaturated group, m is 0 or 1, and n is an integer from 1 to 3, provided that m+n≤3 is satisfied, a plurality of $R^2$ are either identical or different when a plurality of $R^2$ are present, a plurality of $R^3$ are either identical or different when a plurality of $R^3$ are present, a plurality of $A^1$ are either identical or different when a plurality of $A^1$ are present, and a plurality of $X^1$ are either identical or different when a plurality of $X^1$ are present,

wherein $A^1$ is a nitrogen-containing heteroaromatic ring, and $R^{10}$ is a divalent organic group that is bonded to the primary amino group via a chain-shaped hydrocarbon group or an alicyclic hydrocarbon group.

* * * * *